(12) United States Patent
Gale et al.

(10) Patent No.: US 8,259,423 B2
(45) Date of Patent: Sep. 4, 2012

(54) AUTOMOTIVE VEHICLE CHARGE PORT WITH FAULT INTERRUPT CIRCUIT

(75) Inventors: Allan Roy Gale, Livonia, MI (US); Michael W. Degner, Novi, MI (US); Steven F. Chorian, Canton, MI (US); Venkateswa Anand Sankaran, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 84 days.

(21) Appl. No.: 12/502,684

(22) Filed: Jul. 14, 2009

(65) Prior Publication Data

US 2011/0013322 A1    Jan. 20, 2011

(51) Int. Cl.
*H02H 3/00* (2006.01)
*H02H 9/08* (2006.01)

(52) U.S. Cl. ........... 361/42; 361/43; 361/44; 361/45; 361/46; 361/47; 361/48; 361/49; 361/50

(58) Field of Classification Search ............ 361/42
See application file for complete search history.

(56) References Cited

U.S. PATENT DOCUMENTS

| | | | |
|---|---|---|---|
| 4,389,608 A * | 6/1983 | Dahl et al. | 320/137 |
| 5,786,971 A | 7/1998 | Chan et al. | |
| 6,052,266 A | 4/2000 | Aromin | |
| 6,435,293 B1 | 8/2002 | Williams | |
| 6,705,938 B2 | 3/2004 | Everhart et al. | |
| 6,788,504 B2 | 9/2004 | Vanderkolk | |
| 7,016,793 B2 * | 3/2006 | Ye et al. | 702/60 |
| 7,489,093 B2 * | 2/2009 | King et al. | 318/109 |
| 2003/0034147 A1 | 2/2003 | Houck et al. | |
| 2010/0174667 A1 * | 7/2010 | Vitale et al. | 705/412 |

* cited by examiner

*Primary Examiner* — Dharti Patel
(74) *Attorney, Agent, or Firm* — David B. Kelley; Brooks Kushman P.C.

(57) ABSTRACT

An automotive vehicle includes a charge port integrated with the vehicle. The charge port includes electrical contacts configured to receive electrical power from an electric grid, and a fault interrupt circuit electrically connected with the electrical contacts.

13 Claims, 1 Drawing Sheet

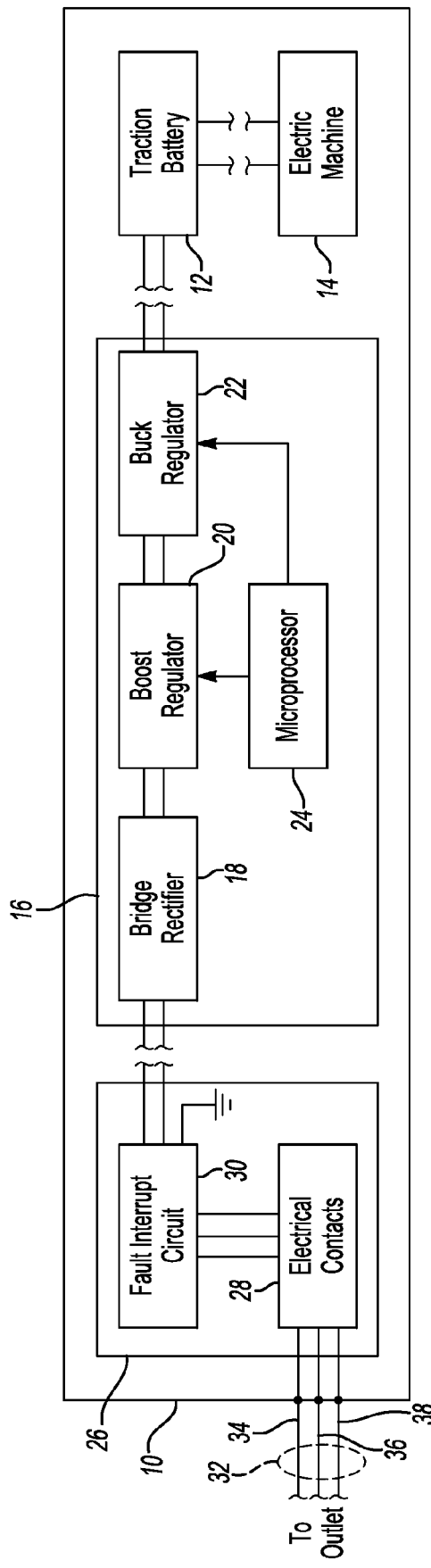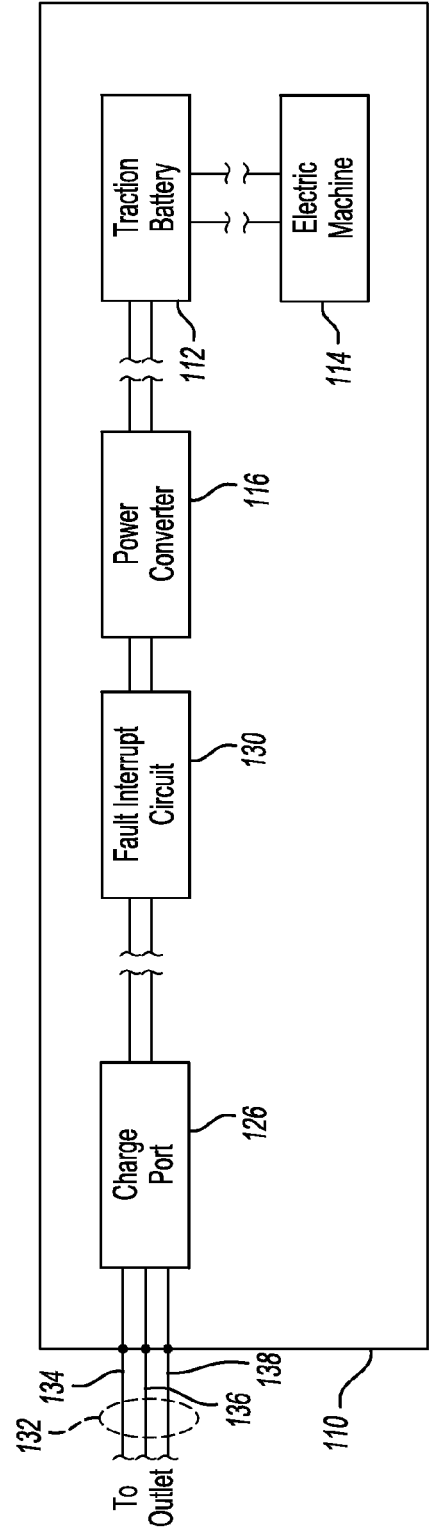

AUTOMOTIVE VEHICLE CHARGE PORT WITH FAULT INTERRUPT CIRCUIT

BACKGROUND

U.S. Pat. No. 6,788,504 to Vanderkolk discloses a mobile system for use in supplying AC power to different types of electrical loads including those having grounded neutrals as well as those having neutrals that are electrically isolated from ground. The system includes a GFCI circuit and can be switched between a first mode, in which the circuit provides AC power with ground fault protection for those loads having ungrounded (isolated) neutrals, and a second mode, in which the GFCI is deactivated so that it will not experience false tripping due to the intentional grounding of the neutral at the load. Both single and multi-phase systems are disclosed which can be incorporated into a vehicle, towed trailer, or portable generator. The system may be used to provide AC power to various types of electrical loads at locations where public utility power is not readily available.

U.S. Pat. No. 6,052,266 to Aromin discloses a ground fault circuit interrupter (GFCI) that interrupts the flow of current through a pair of lines extending between a source of power and a load. The GFCI includes a circuit breaker having a switch located in one of the pair of lines. The switch has a first position in which the source of power in its associated line is not connected to the load and a second position in which the source of power in its associated line is connected to the load. A relay circuit is coupled to the switch selectively positioning the switch in either the first or second position. The relay circuit includes a solenoid, which operates in either an energized or de-energized state. The GFCI also includes a booster circuit for selectively supplying a first voltage through the switch and to the solenoid, which is sufficient to cause the solenoid to switch from its de-energized state to its energized state. A power supply circuit supplies a second voltage to the solenoid, which is less than the first voltage. The second voltage is sufficient to maintain the solenoid in its energized state after being initially energized by the first voltage. A latch circuit operable in first and second bi-stable states allows the solenoid to switch from its de-energized state to its energized state. A fault detecting circuit detects the presence of a fault condition in at least one of the lines and causes the latch circuit to latch in its second bi-stable state upon detection of the fault condition.

U.S. Pat. No. 5,786,971 to Chan et al. discloses a ground fault protection circuit for plural loads connected across a power source with plural branches that can be used where the loads are unbalanced. Each branch includes a ground fault circuit interrupter device that has a common line for the electronics of the GFCI separate from the neutral line from the power source to the load, where the common lines for the electronics for the ground circuit interrupter devices in each branch are connected to a common point. The ground fault protection circuit employs plural ground fault circuit interrupter devices and eliminates nuisance tripping. The common line for the electronics for a GFCI is routed through the core of the current sensing transformer of the GFCI. The separate neutral line for the electronics, connecting the common lines for the electronics for plural GFCI devices and routing the common lines for the GFCI electronics through the core of the transformer of each GFCI, eliminate improper GFCI operation due to unbalanced loading. The ground fault protection circuit may be used for a three phase power source.

SUMMARY

An automotive vehicle includes a battery charger disposed within the vehicle, and a charge port integrated with the vehicle. The charge port includes electrical contacts configured to receive electrical power from an electric grid, and a fault interrupt circuit electrically connected with the electrical contacts and the battery charger.

An automotive vehicle includes a charge port integrated with the vehicle. The charge port includes electrical contacts configured to receive electrical power from an electric grid, and a fault interrupt circuit electrically connected with the electrical contacts.

An automotive power system includes a power storage unit, a power converter electrically connected with the power storage unit, and a charge port integrated with the vehicle. The charge port includes electrical contacts configured to receive electrical power from a remote power source, and a fault interrupt circuit. The fault interrupt circuit is electrically connected with the power converter and the electrical contacts.

While example embodiments in accordance with the invention are illustrated and disclosed, such disclosure should not be construed to limit the invention. It is anticipated that various modifications and alternative designs may be made without departing from the scope of the invention.

BRIEF DESCRIPTION OF THE DRAWINGS

FIG. 1 is a schematic diagram of an embodiment of an automotive vehicle.

FIG. 2 is a schematic diagram of another embodiment of an automotive vehicle.

DETAILED DESCRIPTION

A variety of street- and highway-worthy electric and combination electric/fossil fuel vehicles are becoming available to consumers. New and proposed legislation in several regions around the United States calls for increasing deployment of electric vehicles as a way to reduce air pollution. Certain states have adopted similar requirements. Additionally, the Clean Air Act Amendments of 1990 and the National Energy Policy Act of 1992 regulate public and private purchases of clean-fuel vehicles and alternatively fuelled vehicles, respectively. Electric vehicles fulfill both of those requirements. As a result, electric vehicle charging may be occurring in all occupancies, including residential, commercial, retail, and public sites.

Article 625 of the National Electric Code (NEC) sets forth installation requirements for typical hard-wired conductive connections of battery charging equipment, as well as the safety concerns of new "smart" inductive coupling connections of battery charging equipment. In particular, this article covers the wiring methods, equipment construction, control and protection, and equipment locations for automotive-type vehicle charging equipment. The stated intent of Article 625 is to prevent users of electrical equipment associated with the vehicle charging system from being exposed to energized live parts and to provide a safe vehicle charging environment.

Article 625 requires that the overall length of an electric vehicle supply equipment cable shall not exceed 25 ft. unless equipped with a cable management system that is listed as suitable for the purpose. Additionally, Article 625 requires that electric vehicle supply equipment shall have a listed system of protection against electric shock of personnel. Where cord-and-plug-connected electric vehicle supply equipment is used, an interrupting device of a listed personnel protection system shall be provided and shall be an integral part of the attachment plug or shall be located in the power supply cable not more than 12 in. from the attachment plug.

If non-conforming cord-and-plug-connected electric vehicle supply equipment is used to charge a vehicle (in concert with a non-GFI outlet), electric shock may be experienced.

Referring now to FIG. 1, an embodiment of an automotive vehicle 10, e.g., hybrid electric, electric, etc., includes a traction battery 12, electric machine 14, and battery charger 16. As apparent to those of ordinary skill, the electric machine 14 may convert electrical power from the traction battery 12 to motive power to move the vehicle 10.

The battery charger 16 may include a bridge rectifier 18, boost regulator 20, buck regulator 22 and microprocessor 24. The bridge rectifier 18 is electrically connected with the boost regulator 20, and converts alternating current input to direct current output. The boost regulator 20 is electrically connected with the buck regulator 22. The microprocessor 24 may control the boost and buck regulators 20, 22 in a known fashion. For example, the microprocessor 24 may control the boost regulator 20 to regulate the direct current output by the bridge rectifier 18 for power factor correction, etc. The circuitry of the bridge rectifier 18, boost regulator 20 and buck regulator 22 may take any suitable form.

The embodiment of vehicle 10 further includes a charge port 26 (charging receptacle, etc.) The charge port 26, in the embodiment of FIG. 1, includes electrical contacts 28 and a fault interrupt circuit 30 (e.g., GFI, GFIC, CCID, etc.) The electrical contacts 28 are arranged in a known fashion, and may be electrically connected (e.g., plugged-in) with an electrical wall outlet (serviced by an electrical grid) via a charging cable 32 that includes a line 34, neutral 36 and ground 38.

The fault interrupt circuit 30 (which may take any suitable form) is electrically connected between the electrical contacts 28 and the bridge rectifier 18 of the battery charger 16. The fault interrupt circuit receives the line, neutral and ground voltages from the electrical contacts 28, grounds the ground voltage to, for example, the vehicle chassis (not shown), and passes the line and neutral voltages to the bridge rectifier 18 of the battery charger 16. Locating the fault interrupt circuit 30 within the charge port 26 may improve the ability of the fault interrupt circuit 30 to detect ground faults in the vehicle 10.

As apparent to those of ordinary skill, if the fault interrupt circuit 30 detects a ground fault on the vehicle 10, it can disconnect the power to the vehicle 10 at the charge port 26 in a known fashion.

Referring now to FIG. 2, numbered elements that differ by 100 relative to FIG. 1 may have similar descriptions to the numbered elements of FIG. 1. Another embodiment of an automotive vehicle 110 includes a traction battery 112, electric machine 114, power converter 116, and charge port 126. The power converter 116 in the embodiment of FIG. 2 includes an inverter. As such, electrical power stored by the traction battery 112 may be passed through the inverter and to the charge port 126.

The charge port 126, in the embodiment of FIG. 2, includes a fault interrupt circuit as described with reference to FIG. 1. In other embodiments, the charge port 126 may lack a fault interrupt circuit. Other arrangements are, of course, also possible.

A fault interrupt circuit 130 has been electrically connected between the power converter 116 and the charge port 126. This additional fault interrupt circuit 130 protects, for example, the power converter 116, traction battery 112, and electric machine 114 from ground faults between the charging cable 132 and earth ground (the chassis of the vehicle 110).

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A system comprising:
   a vehicle including a battery charger and a charge port having (i) electrical contacts configured to receive electrical power from an electric grid and (ii) a fault interrupt circuit electrically connected with the electrical contacts and the battery charger.

2. The system of claim 1 wherein the vehicle further includes a power storage unit electrically connected with the battery charger.

3. The system of claim 2 wherein the power storage unit is a traction battery.

4. A system comprising:
   a vehicle including a charge port having (i) electrical contacts configured to receive electrical power from an electric grid and (ii) a fault interrupt circuit electrically connected with the electrical contacts.

5. The system of claim 4 wherein the vehicle further includes a power converter and wherein the fault interrupt circuit is electrically connected with the power converter.

6. The system of claim 5 wherein the power converter is a battery charger.

7. The system of claim 5 wherein the vehicle further includes a power storage unit electrically connected with the power converter.

8. The system of claim 4 wherein the vehicle further includes a power converter and another fault interrupt circuit, and wherein the another fault interrupt circuit is electrically connected with the charge port and the power converter.

9. The system of claim 8 wherein the power converter is an inverter.

10. A system comprising:
    a vehicle including a power storage unit, a power converter electrically connected with the power storage unit, and a charge port having (i) electrical contacts configured to receive electrical power from a remote power source and (ii) a fault interrupt circuit electrically connected with the power converter and the electrical contacts.

11. The system of claim 10 wherein the vehicle further includes another fault interrupt circuit electrically connected with the power converter and charge port.

12. The system of claim 10 wherein the power converter is a battery charger.

13. The system of claim 10 wherein the power storage unit is a battery.

* * * * *